(12) United States Patent
Ono et al.

(10) Patent No.: US 6,839,157 B2
(45) Date of Patent: Jan. 4, 2005

(54) METHOD AND APPARATUS FOR MULTI-BEAM OPTICAL SCANNING CAPABLE OF EFFECTIVELY ADJUSTING A SCANNING LINE PITCH

(75) Inventors: Nobuaki Ono, Kanagawa-ken (JP); Tomohiro Nakajima, Tokyo (JP); Akihisa Itabashi, Tokyo (JP); Kenichi Takanashi, Chiba-ken (JP); Tomoya Ohsugi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 121 days.

(21) Appl. No.: 10/319,624

(22) Filed: Dec. 16, 2002

(65) Prior Publication Data

US 2003/0146375 A1 Aug. 7, 2003

(30) Foreign Application Priority Data

Dec. 14, 2001 (JP) .................................... P2001-381862

(51) Int. Cl.[7] .............................................. G02B 26/08
(52) U.S. Cl. ..................... 359/204; 347/232; 347/241
(58) Field of Search ..................... 359/204, 738–740; 347/233, 232, 241–244

(56) References Cited

U.S. PATENT DOCUMENTS 6,381,057 B1    4/2002   Itabashi
6,400,391 B1    6/2002   Suhara et al.
6,429,956 B2    8/2002   Itabashi
6,469,772 B1   10/2002   Itabashi
6,596,985 B2 *  7/2003   Sakai et al. ................ 250/234

FOREIGN PATENT DOCUMENTS

JP    04-127115    4/1992
JP    10-268217   10/1998

* cited by examiner

*Primary Examiner*—James Phan
(74) *Attorney, Agent, or Firm*—Oblon, Spivak, McClelland, Maier & Neustadt, P.C.

(57) ABSTRACT

An optical scanning apparatus includes light sources, an aperture having, and coupling lenses. Numbers of the light sources and the coupling lenses are equal to each other and the apparatus satisfies an inequality $12.7 < (D \times \beta_0 \times m_0 \times dpi)/(2 \times NA) < 38.1$ and an equation $\beta_0 = (\beta_+ - \beta_-)/(n-1)$, wherein D represents a width of the slit of the aperture, $\beta_0$ represents a beam open angle, mo represents a total lateral magnification ratio, dpi represents a number of dots per inch, NA represents a numerical aperture, $\beta_+$ represents a positive open angle, $\beta_-$ represents a negative open angle, and n represents the number. Further, an image forming apparatus using this optical scanning apparatus and an image forming method are provided.

7 Claims, 8 Drawing Sheets

METHOD AND APPARATUS FOR MULTI-BEAM OPTICAL SCANNING CAPABLE OF EFFECTIVELY ADJUSTING A SCANNING LINE PITCH

BACKGROUND OF THE INVENTION

1. Field of the Invention

The present invention relates to a method and apparatus for multi-beam optical scanning, and more particularly to a method and apparatus for multi-beam optical scanning capable of generating multiple scanning beams for forming multiple latent images in a multicolor image forming apparatus and effectively adjusting scanning line pitches of the multiple scanning beams.

2. Discussion of the Background

In recent years, a tandem-type color image forming apparatus has been developed, including an optical scanning system that emits multiple beams for basic printer colors in sequence. The optical scanning system uses a plurality of laser light sources for generating the color corresponding multiple beams and a plurality of optical components sets, which are integrated in a single-piece unit and are put into a single housing. The apparatus includes plural sets of a photosensitive member and a development unit for forming and developing basic color toner images. The basic color toner images formed on the photosensitive members are transferred one after another at a substantially same position on a recording sheet.

Based on this apparatus, various color image forming apparatuses including color printers, digital color copying machines, and so on have been developed, which includes four photosensitive drums arranged in parallel along a sheet transfer direction and in combination with four development mechanisms for magenta, cyan, yellow, and black colors.

The above-mentioned apparatuses have usually required a relatively large space to accommodate the plurality of optical scanning systems for generating multiple laser beams. Japanese Laid-Open Patent Application Publication No. 04-127115 proposes a structure for an optical scanning system in which a single light deflection device is used and plural sets of optical scanning elements are stacked in the sub-scanning direction.

FIG. 1 is a top view of a background multi-beam optical scanning apparatus having four optical scanning systems sharing a single light deflection device although only two of them are seen in FIG. 1. In FIG. 1, reference number 1 denotes a light source, reference numeral 2 denotes a coupling lens, reference numeral 3 denotes an aperture element, reference numeral 4 denotes a first imaging optical device set, reference numeral 5 denotes a light deflection device, reference numeral 6 denotes a second imaging optical device set, and reference numeral 7 denotes a photosensitive member.

In each of the optical scanning systems, the first imaging optical device set 4 changes a laser light beam emitted from the light source 1 and passing through the coupling lens 2 and the aperture element 3 into a line image extended in a main scanning direction in the vicinity of a deflective reflection surface of the light deflection device 5. The second imaging optical device set 6 changes the laser light beam deflected by the light deflection device 5 into a laser light spot on a surface of the photosensitive member which serves as a member for carrying an image.

In the above-mentioned background multi-beam optical scanning apparatus shown in FIG. 1, the laser light beam emitted from the light source 1 is changed into a desired shape by the coupling lens 2 and, after passing through the aperture element 3, the laser light beam is processed through the first imaging optical device set 4 to form a line image extending in the main scanning direction in the vicinity of the deflective reflection surface of the light deflection device 5. The laser light beam is deflected in directions within a predetermined angle by the rotation of the light deflection device 5 to scan the surface of the photosensitive member 7 after passing through the second optical imaging device set 6 to form an image thereon. As shown in FIG. 1, the optical scanning systems are arranged on left and right sides in a symmetric formation with the light deflecting device 5 therebetween.

FIG. 2 shows a cross section of the above-mentioned background multi-beam optical scanning apparatus in the sub-scanning direction. In FIG. 2, reference numeral 8 denotes an optical element included in the second optical imaging device set 6, and the optical elements 8 are stacked in the sub-scanning direction.

FIG. 3 schematically shows the structure from the light source 1 to the light deflecting device 5 of the above-mentioned background multi-beam optical scanning apparatus, seen in a direction horizontally traversing the axis of the laser light beams. The laser light beams emitted from the light source 1 are coupled by the coupling lens 2 and pass through the first optical imaging device set 4. After passing through the first optical imaging device set 4, the laser light beams form a line image extending in the main scanning direction in the vicinity to the light deflection device 5.

In the above-mentioned background multi-beam optical scanning apparatus, many optical devices are made of plastic materials. While plastic materials are superior for mass production, they often fail in forming a desired shape due to an uneven temperature provided inside a mold tool during a mold process or an uneven cooling applied after the removal from the mold tool. In the optical scanning system, many optical devices typically have extended lengths in the main scanning direction. These optical devices are apt to bend in the sub-scanning direction. This can cause a deviation of dot positional in the sub-scanning direction if an optical device is not held in a preferable manner.

FIG. 4 shows a displaced scanning line due to the deviation of dot position formed on the photosensitive member 7. In FIG. 4, L1 represents a preferable scanning line and L2 represents a displaced scanning line.

When the optical devices are mounted to the optical housing, cumulative errors in the mounting positions can often occur and they become a non-negligible deviation in dot position in the sub-scanning direction on the photosensitive surface. This phenomenon is a crucial drawback, particularly, for a tandem-type full color copying apparatus. Generally, a tandem-type full color copying apparatus is provided with an optical scanning system and four photosensitive drums serving as image carrying members for carrying images of cyan (C), magenta (M), yellow (Y), and black (K) colors, arranged along with a sheet transfer surface of a transfer belt. The multi-beam optical scanning system forms latent images of cyan, magenta, yellow, and black colors with a plurality of laser light beams on the respective surfaces of the photosensitive drums. Then, the latent images are individually developed into visual images with respective color toners and are sequentially transferred onto a surface of a recording sheet in an overlaying fashion. Thus, if dot positions of the latent images for the cyan, magenta, yellow, and black colors are deviated in the sub-scanning direction, a phenomenon of color deviation occurs and accordingly image quality is degraded.

An important point to improve the quality of a color image created by such a full color copying machine handling multiple colors as described above is precise adjustment of the scanning lines of the multiple laser light beams for the respective color images to the same position to perfectly overlay each other. Errors in scanning line positioning occur mainly because of deviations of the multiple laser light beams in the sub-scanning direction. Such deviations are apt to be caused by deformed molded plastic optical devices since, as noted above, many optical devices are provided as molded plastic materials to reduce the cost of manufacturing.

Japanese Laid-Open Patent Publication No. 10-268217 describes an optical scanning system which provides a slit-shaped plastic lens with each set of lenses for a light beam. In this system, the slit-shaped plastic lens is previously bent in the sub-scanning direction to attempt to correct for a bend of the scanning line. However, in this attempt, relative positions between the scanning lines in the sub-scanning direction, that is, the scanning line pitch, are not considered.

SUMMARY OF THE INVENTION

In view of the foregoing, it is an object of the present invention to provide a novel optical scanning apparatus which produces multiple laser light beams having a preferable beam pitch without causing deviations in image density.

Another object of the present invention is to provide a novel image forming apparatus which includes an optical scanning apparatus that produces multiple laser light beams having a preferable beam pitch without causing deviations in image density.

In one aspect of the invention, a novel optical scanning apparatus includes a plurality of light sources, an aperture having at least one slit, and a plurality of coupling lenses. In this apparatus, numbers of the plurality of light sources and the plurality of coupling lenses are equal to each other and the apparatus satisfies the following inequality and equation:

$$12.7 < (D \times \beta_0 sm_0 \times dpi)/(2 \times NA) < 38.1;$$

and $$\beta_0 = (\beta_+ - \beta_-)/(n-1),$$

wherein D represents a width of the above-mentioned at least one slit of the aperture, $\beta_0$ represents a beam open angle, $m_0$ represents a total lateral magnification ratio, dpi represents a number of dots per inch, NA represents a numerical aperture, $\beta_+$ represents a positive open angle, $\beta_-$ represents a negative open angle, and n represents the above-mentioned numbers.

The total lateral magnification $m_o$ can further satisfy an inequality; $1 < m_0 < 15$.

Each of the plurality of light sources can further include a laser diode or a laser diode array including more than one light emission point.

When each of the plurality of light sources include a laser diode array including more than one light emission point, the total lateral magnification ratio $m_0$ can further satisfy an inequality $0.5 \leq m_0 \leq 15$.

The above-mentioned apparatus can further satisfy an inequality; $0.3 < (D \times \beta_0 \times m_0)/(2 \times NA \times W) < 1.5$, wherein W represents a diameter of a laser light beam spot at a $1/e^2$ intensity point.

Further, in another aspect of the present invention, a novel image forming apparatus includes a plurality of photosensitive members each having a photosensitive surface, a plurality of development mechanisms each configured to develop an image with a different color toner, and an optical scanning apparatus. The optical scanning apparatus includes a plurality of light sources, a plurality of coupling lenses, and an aperture having at least one slit. In this apparatus, numbers of the plurality of light sources and the plurality of coupling lenses are equal to each other and said apparatus satisfies the following inequality and equation:

$$12.7 < (D \times \beta_0 \times m_0 \times dpi)/(2 \times NA) < 38.1;$$

and $$\beta_0 = (\beta_+ - \beta_-)/(n-1),$$

wherein D represents a width of the above-mentioned at least one slit of the aperture, $\beta_0$ represents a beam open angle, $m_0$ represents a total lateral magnification ratio, dpi represents a number of dots per inch, NA represents a numerical aperture, $\beta_+$ represents a positive open angle, $\beta_-$ represents A negative open angle, and n represents the numbers, and wherein the optical scanning apparatus forms latent images for development in different colors on the photosensitive surfaces of the plurality of photosensitive members and the latent images for the different colors are developed into visual images with the different color toners by the plurality of development mechanisms.

Another aspect of the invention includes a plurality of optical device sets each configured to generate multiple laser light beams. The novel optical scanning apparatus further includes a light deflection mechanism configured to deflect the multiple laser light beams from the plurality of optical device sets to form different latent images on respective photosensitive surfaces. In this apparatus, each set of the plurality of optical device sets includes a prism which is arranged between a coupling lens included in the above-mentioned each set and the light deflecting mechanism, the prism being configured to move in a direction to change positions of the multiple laser light beams in a particular direction.

The above-mentioned particular direction may be the sub-scanning direction, or a direction to rotate around a light axis of the coupling lens, or a direction to tilt about an axis orthogonal to a light axis of the coupling lens.

Further, another aspect of the present invention includes a novel image forming apparatus with a plurality of photosensitive members each having a photosensitive surface, a plurality of development mechanisms each configured to develop an image with a different color toner, and an optical scanning apparatus. The optical scanning apparatus includes a plurality of optical device sets each configured to generate multiple laser light beams. The optical scanning apparatus further includes a light deflection mechanism configured to detect the multiple laser light beams from the plurality of optical device sets to form different latent images on respective photosensitive surfaces. In this apparatus, each set of the plurality of optical device sets includes a prism which is arranged between a coupling lens included in the above-mentioned each set and the light deflecting mechanism and is configured to move in a direction to change positions of the multiple laser light beams in a particular direction. Further, in the above-mentioned apparatus, the latent images on the respective photosensitive surfaces of the plurality of photosensitive members are developed into visual images with different respective color toners by the plurality of development mechanisms.

In another aspect of the present invention a novel optical scanning method is provided that includes providing a plurality of optical device sets, each generating multiple laser light beams. The novel optical scanning method further includes deflecting the multiple laser light beams from the plurality of optical device sets to form different latent images on respective photosensitive surfaces with a light deflecting mechanism, wherein each of the plurality of optical device sets includes a prism arranged between a coupling lens in each set and the light deflecting mechanism and moving each prism in a first direction to change positions of the multiple laser light beams in a particular direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
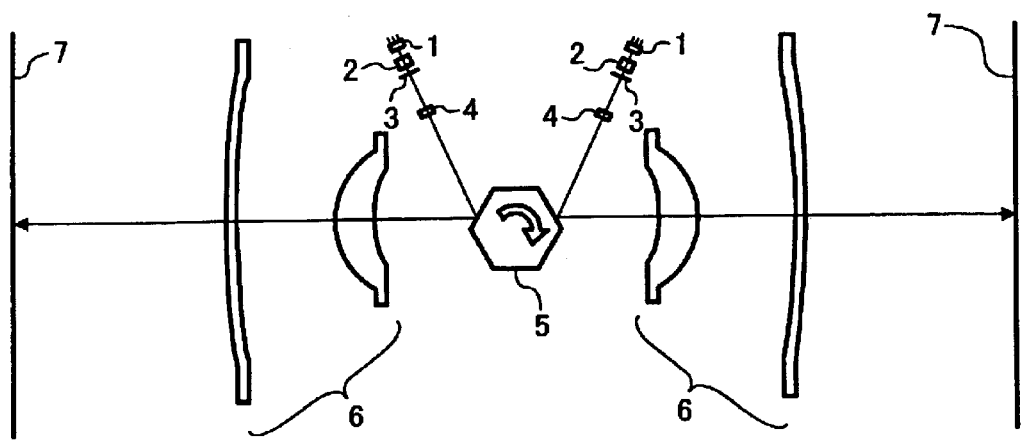
FIG. 1 is a schematic illustration for explaining a background multi-beam optical scanning system.
Figure 2:
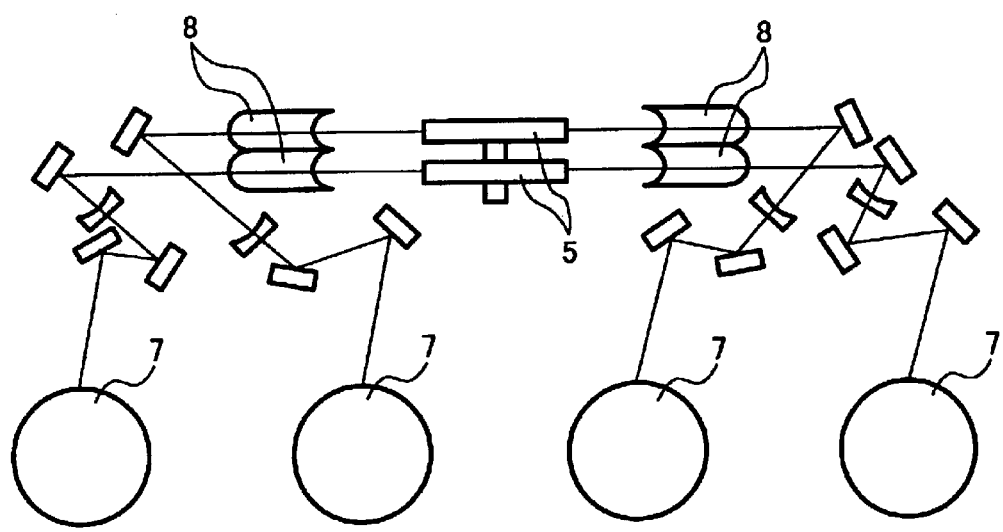
FIG. 2 is a schematic illustration for explaining an image forming apparatus using the background multi-beam optical scanning system of FIG. 1.
Figure 3:
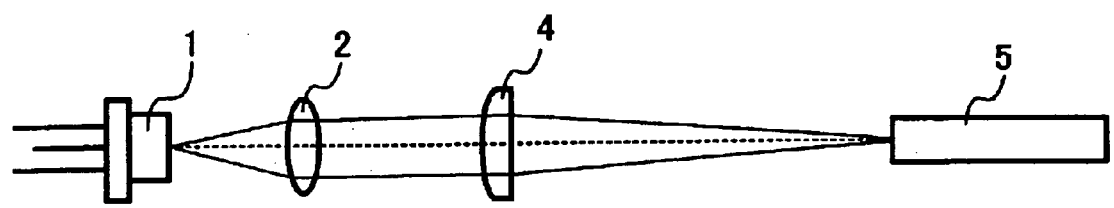
FIG. 3 is a schematic illustration showing an arrangement of a part of the background multi-beam optical scanning system of FIG. 1 from a light source to a light deflection device.
Figure 4:
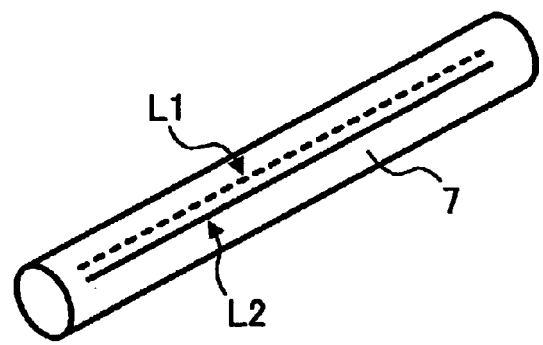
FIG. 4 is a schematic illustrating showing a deviation of scanning lines on a photosensitive drum in the background multi-beam optical scanning system of FIG. 1.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 5:
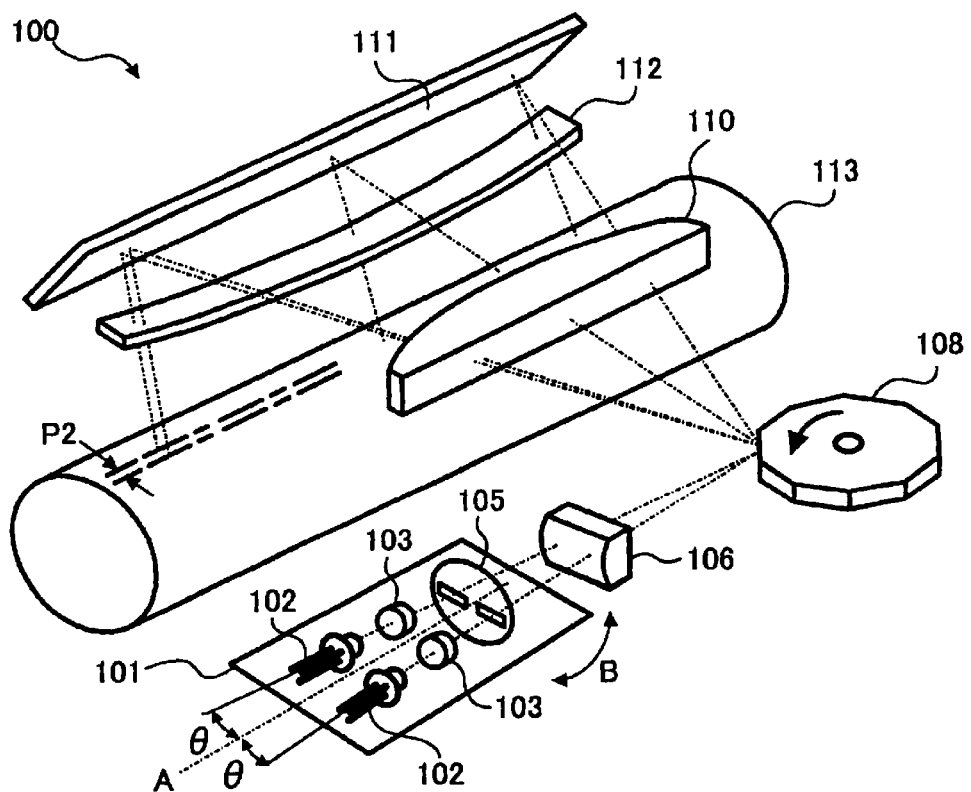
FIG. 5 is a schematic illustration of a multi-beam optical scanning apparatus according to a preferred embodiment of the present invention.
Figure 6:
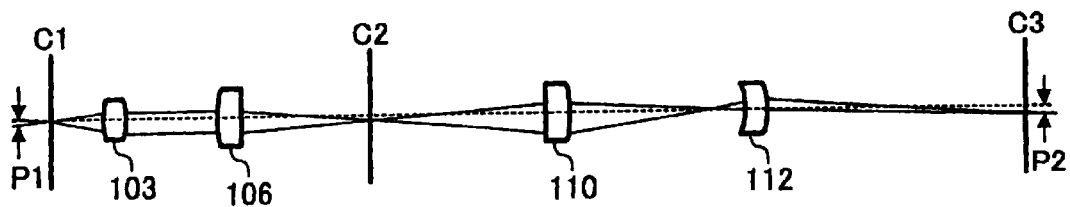
FIG. 6 is a schematic illustration showing an arrangement of optical lens devices in a form extending in a horizontal line, used in the multi-beam optical scanning apparatus of FIG. 5.
Figure 7:
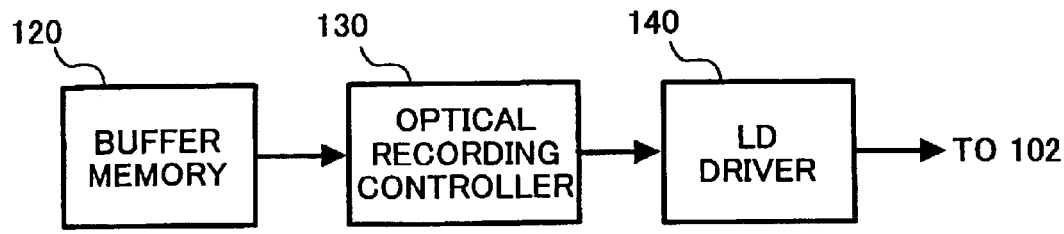
FIG. 7 is a block diagram of a control and driving circuitry for controlling and driving light sources of the multi-beam optical scanning apparatus of FIG. 5.

Referring now to the drawings, wherein like reference numerals designate identical or corresponding parts throughout the several views, particularly as to FIGS. 5–7, a description is made of a multi-beam optical scanning apparatus 100 according to a preferred embodiment of the present invention. As shown in FIG. 5, the multi-beam optical scanning apparatus 100 is provided with a laser light source unit 101 that includes two light sources 102 (e.g., laser diodes) and a corresponding pair of coupling lenses 103 and an aperture element 105 having two slits. The multi-beam optical scanning apparatus 100 further includes a cylindrical lens 106, a rotating polygon mirror 108, an fθ (ef-theta) lens 110, a mirror 111, and a toroidal lens 112.

Each pair of light sources 102 and coupling lenses 103 is arranged such that a beam axis of a laser light beam emitted from each light source 102 matches a light axis of the corresponding coupling lens 103. The pairs of the light sources 102 and the coupling lenses 103 are also arranged such that the respective beam axes are each symmetrically angled by an angle θ relative to a center beam axis A of a laser scanning beam in a main scanning direction, as shown in FIG. 5. With this arrangement, the angled beam axes meet each other at a reflection point on the rotating polygon mirror 108. The angle θ is referred to as a light beam emission angle and is preferably 1.5 degrees, for example.

The laser light beam emitted from each of the light sources 102 is deformed into an approximate parallel light beam by the corresponding coupling lens 103. Then, each laser light beam successively passes through a corresponding slit of the aperture element 105 by which each laser light beam is further deformed to have a desired shape. Then, the shaped laser light beams pass through the cylinder lens 106 by which the laser light beams are intensified in a sub-scanning direction and each make a corresponding image having a line-like shape extending in the main scanning direction at a position in a vicinity of the reflection point of rotating polygon mirror 108. The thus-deformed two laser light beams are simultaneously reflected by the mirror surface of the polygon mirror 108 in a continuous fashion and, respectively, become scanning laser light beams. After that, the two scanning laser light beams fall on a surface of a photosensitive member 113 via various optical components including the fθ (ef-theta) lens 110, the mirror 111, and the toroidal lens 112. Accordingly, with appropriate control of the scanning laser light beams, a desired image can be formed on the surface of the photosensitive member 113 using an electrophotographic method.

The above-mentioned laser light source unit 101 can be tilted in a direction indicated by arrows B about the center beam axis A of the laser scanning. beam in the main scanning direction, as shown in FIG. 5. With this tilt, the light emission points of the light sources 102 have a pitch P1 (see FIG. 6) in the sub-scanning direction and this pitch P1 is magnified to a pitch P2 (see FIG. 6) of scanning lines drawn by the scanning laser light beams on the photosensitive member 113. That is, the pitch P2 is adjusted by a tilt of the laser light source unit 101.

In addition, the number of pairs of the light sources 102 and the coupling lenses 103 is not limited to two as shown, and any even number of pairs, such as four pairs or six pairs, for example, can be used. When four pairs of the light sources 102 and the coupling lenses 103 are provided, for example, four scanning laser light beams are generated and four scanning lines are drawn on the photosensitive member 113 at the same time.

FIG. 6 schematically shows the arrangement of the above-described optical components in a form extending in a horizontal line. In FIG. 6, C1, C2, and C3 represent a plane of a light point of the light source 102, the surface of the polygon mirror 108, and the surface of the photosensitive member 113.

As shown in FIG. 7, the multi-beam optical scanning apparatus 100 further includes a buffer memory 120, an optical recording controller 130, and an LD (laser diode) driver 140. The buffer memory 120 stores a line of print data per light source (i.e., for each of the laser diodes 102). The optical recording controller 130 controls a transfer of a line of print data from the buffer memory 120 in synchronism with a changing effective mirror of the rotating polygon mirror 108. The LD driver 140 simultaneously drives the light sources 102 to generate two laser light beams which can simultaneously scan the surface of the photosensitive member 112.

With the above-described structure, the multi-beam optical scanning apparatus 100 can perform a high speed optical recording on the photosensitive member 113 with simultaneous two-line scanning.

The above-described multi-beam optical scanning apparatus 100 satisfies the following inequality I1:

$$12.7 < (D \times \beta_0 \times m_0 \times dpi)/(2 \times NA) < 38.1.$$

In Inequality I1, D represents a slit width of the aperture element 105 in the main scanning direction. The term $\beta_0$ represents a beam open angle of the two laser light beams relative to a light axis of the coupling lenses 103 and which is further defined below. The term $m_0$ represents a total lateral magnification ratio in the sub-scanning direction obtained by the entire optical spanning system, that is, throughout the length of from A1 to A3 of FIG. 6. The term dpi represents a number of dots per inch. The term NA represents a numerical aperture relating to a brightness of image and indicating a range of a laser light beam that contributes to imaging. The numerical aperture is usually expressed by sinα, wherein a (not shown) is a semiangle of the light beam emitted from the point light source relative to the light axis of the coupling lens. The beam open angle $\beta_0$ is defined by the following Equation E1:

$$\beta_0 = (\beta_+ - \beta_-)/(n-1),$$

wherein n is 2, representing a number of pairs of the light sources 102 and the coupling lenses 103 in this embodiment, but can be any integer number greater than 1 depending upon the optical scanning system. The angle $\beta_+$ which is referred to as a positive tilt angle, is a positive number and represents a tilt angle of a main light ray of a most-plus-sided laser light beam in the sub-scanning direction out of a plurality of laser light beams passing through the coupling lenses 103, relative to the sub-scanning direction. The angle $\beta_-$ which is referred to as a negative tilt angle, is a negative number and represents a tilt angle of a main light ray of a most-minus-sided laser light beam out of the plurality of laser light beams passing through the coupling lenses 103, relative to the sub-scanning direction. The angles $\beta_0$, $\beta_+$, and $\beta_-$ are expressed in units of radians.

The above-mentioned Inequality I1 represents a relationship of the pitch of the laser light beams in the sub-scanning direction at the light sources (i.e., the laser diodes 102) and the pitch of the scanning lines in the sub-scanning direction on the imaging surface (i.e., the surface of the photosensitive member 113) with upper and lower limits. Exceeding the upper and lower limits can produce a faulty image having an inappropriate density, for example.

Inequality I1 includes an appropriate value of the lateral magnification ratio $m_0$ in the sub-scanning direction by the entire optical scanning system, which is preferably set within a limit expressed by the following Inequality I2:

$$1 \leq m_0 \leq 15.$$

When the value of the lateral magnification ratio $m_0$ is smaller than 1, the optical components of the optical scanning system are too large and therefore the amount of light lost can increase. On the other hand, when the value of the lateral magnification ration mO is greater than 15, the laser light beam entering the optical components of the optical scanning system is too large and therefore a wavefront aberration is degraded so that a beam spot can become too fat.

In the multi-beam optical scanning apparatus 100, it is preferable to define the above-mentioned light beam emission angle θ which is the angle of the laser light beam emitted from the light source 102 relative to the center light axis in the main scanning direction. The light beam emission angle θ is preferably defined by the following Inequality I3:

$$0 < \theta_0 \leq (10/180) \times \pi,$$

wherein $\theta_0$ represents an open angle of a plurality of laser light beams passing through the coupling lens 105 relative to the main scanning direction and is defined by the following Equation E2;

$$\theta_0 = \theta_+ - \theta_-.$$

The term $\theta_+$ is a positive number and represents a tilt angle of a most-plus-sided laser light beam in the main scanning direction out of the plurality of laser light beams passing through the coupling lenses 103. The term $\theta_-$ is a negative number and represents a tilt angle of a most-minus-sided laser light beam in the main scanning direction out of the plurality of laser light beams passing through the coupling lenses 103. The angles $\theta_0, \theta_+,$ and $\theta_-$ are expressed in units of degrees.

When the open angle $\theta_0$ exceeds the upper limit of Inequality I3, the light reflection point on the polygon mirror 108 can sag and an image curvature on the photosensitive member 113 can be degraded.

In the multi-beam optical scanning apparatus 100 fulfilling Inequality I3, it is preferable to determine an appropriate position of scanning in both main and sub-scanning directions by satisfying the following Inequality I4:

$O > |\beta_O \times \theta_O| < 0.00002$.

When an absolute value of $(\beta_O \times \theta_O)$ exceeds the upper and lower limits of Inequality I4, the pitch of the laser light beams on the photosensitive member 113 becomes unstable and the resolution is reduced during the initial settings. As a result, it becomes difficult to reproduce a high quality image.

Further, the multi-beam optical scanning apparatus 100 fulfilling Inequality I1 preferably satisfies the following Inequality I5:

$$0.3 > (D \times \beta_0 \times m_0)/(2 \times NA \times W) < 1.5,$$

wherein W represents a diameter of the laser light beam spot at a $1/e^2$ intensity point in the sub-scanning direction on the photosensitive member 113.

In Inequality I5, if a value of $(D \times \beta_0 \times m_0)/(2 \times NA \times W)$ is smaller than 0.3, adjacent dots will excessively overlap each other so that the resolution and the halftone capability are degraded. On the other hand, if the value is greater than 1.5, adjacent dots are excessively separated from each other and a solid image cannot be reproduced.

Also, in the multi-beam optical scanning apparatus 100 fulfilling Inequality I1, a relationship between a lateral magnification ratio $m_1$ obtained by a portion of the optical scanning system from A1 to A2 of FIG. 6 and a lateral magnification, ratio $m_2$ obtained by the remaining portion from A2 to A3 of FIG. 6 preferably satisfies the following Inequality I6:

$$2 < m_1^2 \times m_2 < 85.$$

When the value of $m_1^2 \times m_0$ is smaller than the lower limit, the scanning lenses in the multi-beam scanning apparatus 100 have dimensions that are too large. On the other hand, when the value of $m_1^2 \times m_0$ is greater than the upper limit, variations in the pitch of the laser light beams on the photosensitive member 113 are increased.

Figure 8:
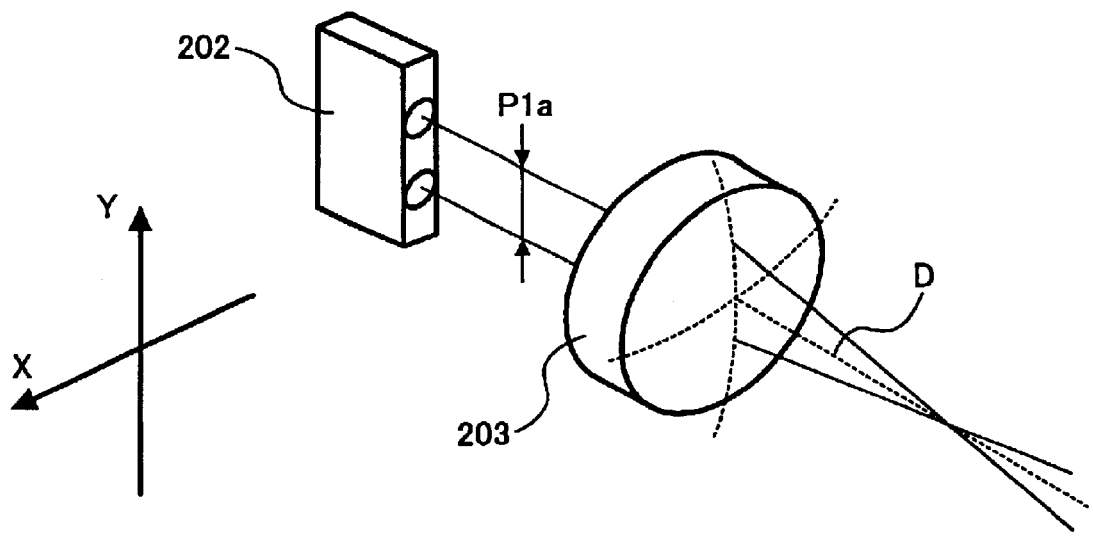
FIG. 8 is a schematic illustration showing a laser diode array as a substitution for the light source of the multi-beam optical scanning apparatus of FIG. 5.

In the laser light source unit 101 of the multi-beam scanning apparatus 100, each of the light sources 102 and the associated coupling lens 103 may be formed as a monolithic laser diode array 202 (see FIG. 8) that includes two laser emission points, for example, and a common coupling lens 203. As shown in FIG. 8, the two laser emission points of the laser diode array 202 are arranged with a pitch P1$a$ of 25 μm, for example, symmetrically relative to a light axis D of the common coupling lens 203 in the sub-scanning direction. Laser light rays diverging from the respective two light emission points of the laser diode array 202 are collimated by the common coupling lens 203. In FIG. 8, X and Y represent the main scanning and sub-scanning directions, respectively.

Figure 9:
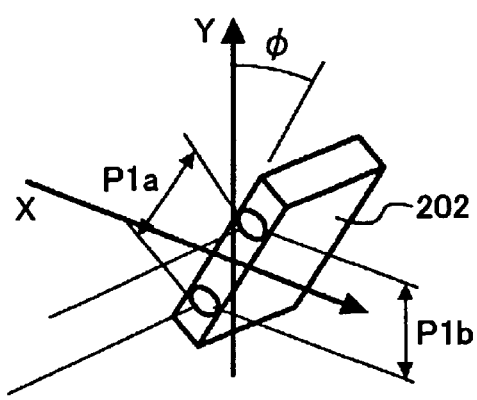
FIG. 9 is a schematic illustration for explaining a way of adjusting a pitch of light emission points in the sub-scanning direction.

FIG. 9 shows the tilt control of the laser diode array 202 about the light axis D of the common coupling lens 203 to adjust the pitch P2 of the beam spots formed on the photosensitive member 113 according to a predetermined lateral magnification ratio. When the laser diode array 202 is adjusted by a tilt angle ψ, the pitch of the two laser emission points of the laser diode array 202 in the sub-scanning direction is changed from the pitch P1$a$ to P1$b$. Accordingly, the pitch P2 is obtained on the basis of the pitch P1$b$.

When the multi-beam scanning apparatus 100 uses a pair of the above-mentioned monolithic laser diode arrays 202 and two common coupling lenses 203 in place of two individual light sources 102 and two separate coupling lenses 103, Inequality I1 determining an appropriate value of the lateral magnification ratio $m_0$ in the sub-scanning direction by the entire optical scanning system is preferably set within a limit expressed by Inequality I7:

$$0.5 \leq m_0 \leq 15.$$

When the value of the lateral magnification ratio $m_0$ is smaller than 0.5, the optical components of the optical scanning system are too large and therefore the amount of light lost can increase. On the other hand, when the value of the lateral magnification ration mO is greater than 15, the laser light beam entering the optical components of the optical scanning system is too large and therefore a wavefront aberration is degraded so that the beam spot can become too fat.

By using the above-described multi-beam optical scanning apparatus 100, an image forming apparatus such as a laser printer, a digital copying machine, and so on, for example, can be structured, employing an electrophotographic method including a charging, an exposure, a development, an image transfer, an image fixing, a cleaning, and a discharging. In such an image forming apparatus, the multi-beam optical scanning apparatus 100 performs the multi-beam optical scanning and, as a result, forms a latent image on the surface of the photosensitive member 113. The formed latent image is then developed with toner into a visual toner image.

Figure 10:
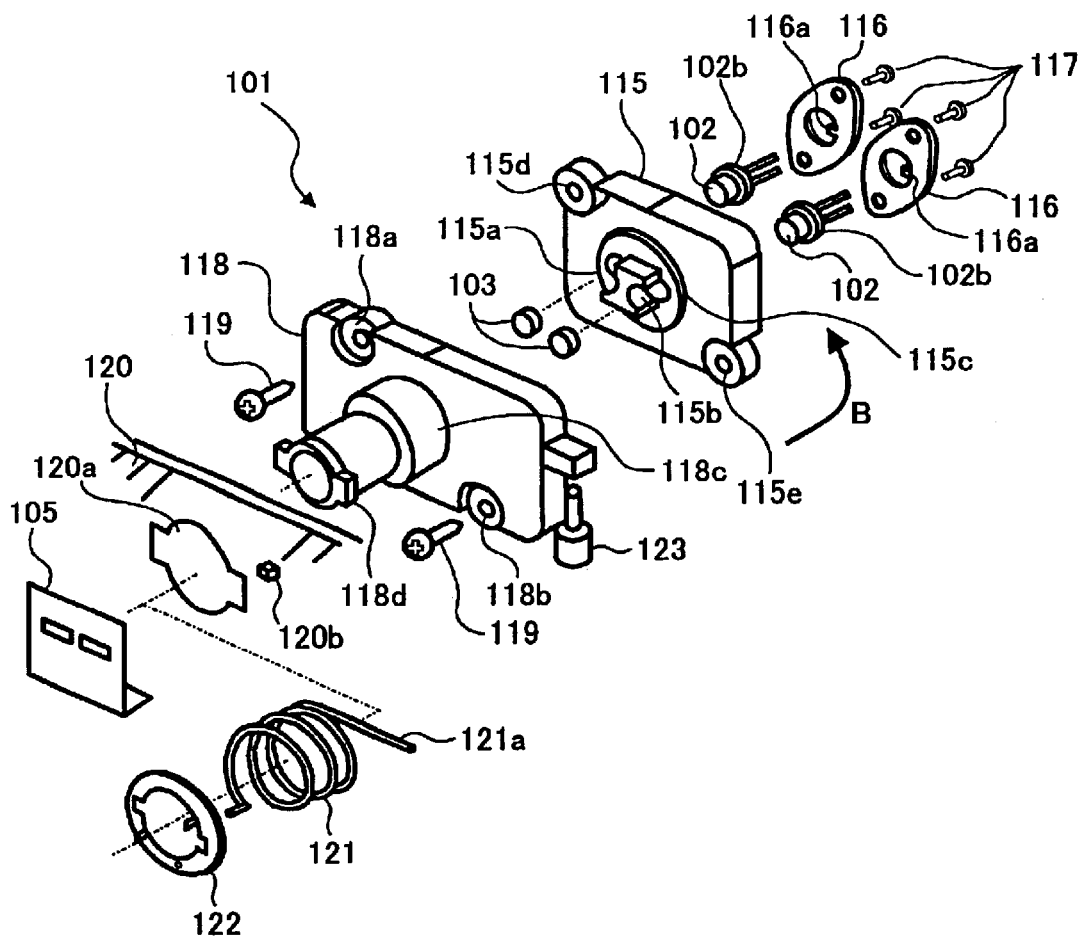
FIG. 10 is a schematic illustration for explaining in detail an exemplary structure of a light source unit used in the multi-beam optical scanning apparatus of FIG. 5.

FIG. 10 illustrates a more detailed structure of the laser light source unit 101. As illustrated in FIG. 10, the laser light source unit 101 includes a base 115 for mounting the two light sources 102. The base 115 is provided with two holes (not shown) in the rear side of the base 115 with an angle of 1.5 degrees relative to the light axis A (see FIG. 5) in the main scanning direction. The light sources 102 are inserted into the respective two holes of the base 115, and cylindrically-shaped heatsink portions 102$b$ of the light sources 102 are engaged with the respective two holes. The cylindrically-shaped heatsink portions 102$b$ of the light sources 102 have notches (not shown) which are engaged with respective projections 116$a$ of mounting members 116. Thereby, the light sources 102 are arranged at appropriate positions, and the light sources 102 engaged with the mounting members 116 are fixed to the base 115 with screws 117 from the back of the mounting members 116. The base 115 has half-moon-shaped guides 115$a$ and 115$b$ in front thereof, into which the coupling lenses 103 are respectively inserted and circumferential portions thereof are engaged. After being engaged with the half moon-shaped guides 115$a$ and 115$b$, the coupling lenses 103 are adjusted to make the diverging laser beams into parallel laser beams. The coupling lenses 103 are then fixed with an adhesive agent.

In the example being explained, the above-mentioned two holes (not shown) for engaging the light sources 102 and the half-moon-shaped guides 115$a$ and 115$b$ are provided to the base 115 with a slight angle relative to the center axis of the base 115 such that the light rays emitted from the light sources 102 intersect each other in a plane in the main scanning direction, as described above.

The base 115 has a cylindrical portion 115$c$ which is inserted into a hollow of a holder 118. The base 115 and the holder 118 are fixed with screws 119 through screw holes 115$d$ and 115$e$ of the base 115 and through screw holes 118$a$ and 118$b$ of the holder 118. Thereby, the base 115 is fixed to the laser light source unit 101.

The holder 118 has a cylindrical portion 118$c$ which is engaged with a mounting wall 120 of the optical housing (not shown) provided to the laser light source unit 101. More precisely, the cylindrical portion 118$c$ is inserted into a reference hole 120$a$ of the mounting wall 120. A spring 121 is inserted relative to the cylindrical portion 118$c$ projected from the front surface of the mounting wall 120. A stopper 122 is engaged with a projection portion 118$d$. Thus, the holder 118 is held in close contact to the rear surface of the mounting wall 120 and accordingly the laser light source unit 101 is fixed to the mounting wall 120.

Figure 11:
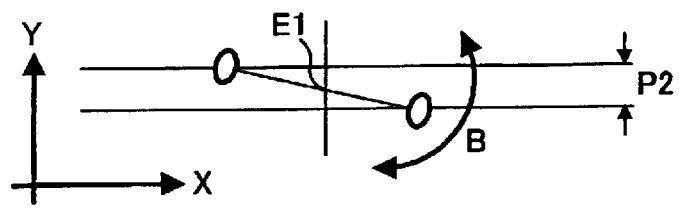
FIG. 11 is a schematic illustration for explaining a way of adjusting a pitch of light emission points in the sub-scanning direction in the light source unit of FIG, 10.

The spring 121 has an end 121a which is engaged with a projection 120b of the wall 120 so that a rotational force is generated to rotate the cylindrical portion 118c, that is, to rotate the whole laser light source unit 101 about a center axis of the cylindrical portion 118c. An adjustment screw 123 adjusts a stop position at which the laser light source unit 101 is stopped against this rotational force. With this adjustment, the laser light source unit 101 can instantly be tilted about the light axis in the direction B. By rotating the laser light source unit 101 in the direction B, the pitch P1b of the two light emission points can be adjusted. The aperture element 105 having the slits is fixed to the optical housing (not shown) of the laser light source unit 101 to regulate the shape of the laser light beams. As a result, and as shown in FIG. 11, the laser light beam spots formed on the photosensitive member 113 are rotated about a center point E1 between two laser light beam spots to provide a desired pitch P2 in the sub-scanning direction.

Figure 12:
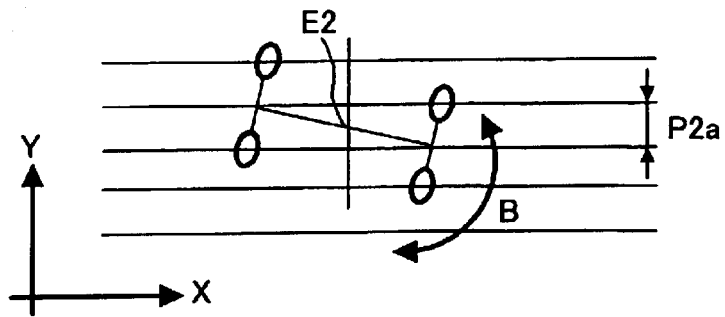
FIG. 12 is a schematic illustration for explaining a way of adjusting a pitch of light emission points in the sub-scanning direction when the laser diode array of FIG. 8 is used in the multi-beam optical scanning apparatus of FIG. 5.

When using two of the monolithic laser diode arrays 202 (see FIG. 8) that each include two laser emission points, for example, and two of the common coupling lenses 203 associated in place of the pair of individual light source 102 and coupling lenses 103, the tilt adjustment of the laser light source unit consequently rotates the four laser light beam spots about a center point E2 between the four laser light beam spots such that adjacent two of the laser light beam spots arranged in a staggered formation are adjusted to have a desired pitch P2a in the sub-scanning direction, as shown in FIG. 12.

Figure 13:
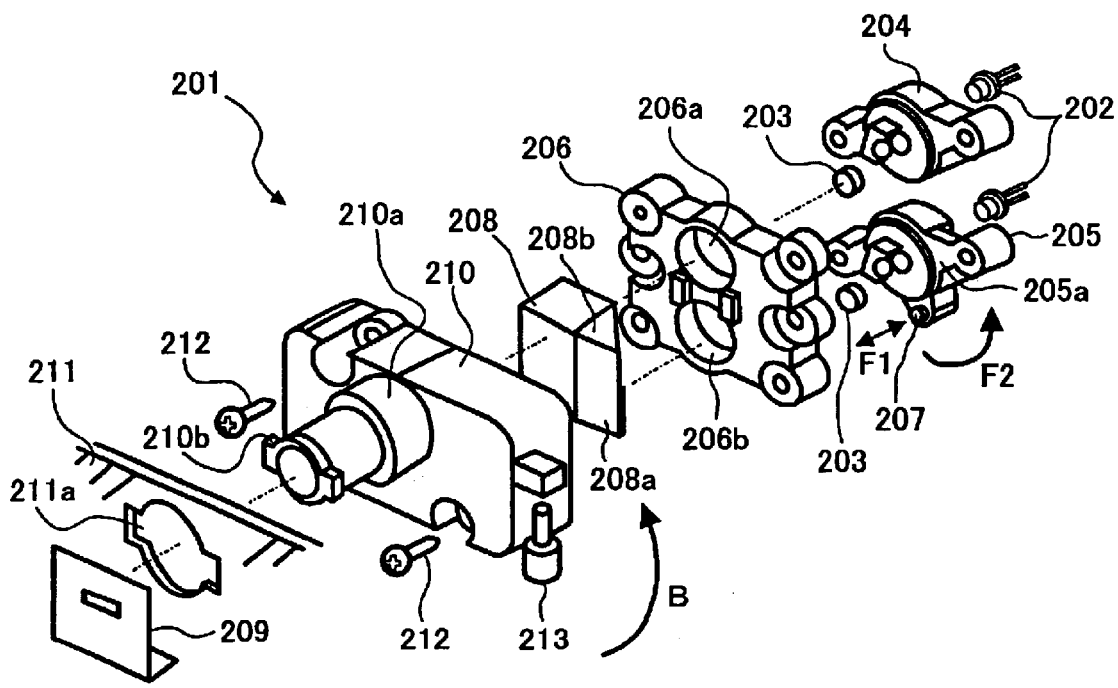
FIG. 13 is a schematic illustration for explaining in detail an exemplary structure of a light source unit including the laser diode array of FIG. 8 for the multi-beam optical scanning apparatus of FIG. 5.
Figure 14:
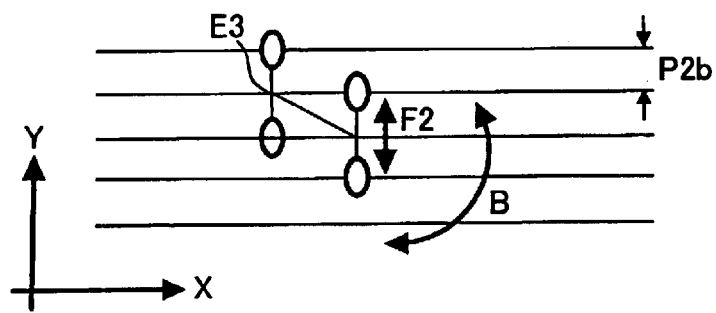
FIG. 14 is a schematic illustration for explaining a way of adjusting a pitch of light emission points in the sub-scanning direction in the light source unit of FIG. 10.

FIG. 13 illustrates a laser light source unit 201 according to another preferred embodiment of the present invention. The laser light source unit 201 has an exemplary structure to synthesize laser beams emitted by two laser diode arrays, e.g., the laser diode arrays 202. As shown in FIG. 13, the laser light source unit 201 includes two pairs of the laser diode arrays 202 and the common coupling lens 203 for each array. The pairs are held with respective bases 204 and 205 in manners similar to those described for the laser light source unit 101. The bases 204 and 205 are engaged with a common flange member 206 by being inserted into holes 206a and 206b, respectively, of the common flange member 206 and fixed with screws (not shown). The base 205 is provided with an adjustment screw 207 which is screwed in and out in a direction F1 from the rear side so that an amount of projection from the front side can be adjusted. By rotating the adjustment screw 207, an arm portion 205a of the base 205 is twisted in a direction F2 so that a supporting portion (not shown) of the laser diode array 202 and the coupling lens 203 mounted to the base 205 is tilted in the sub-scanning direction. Thereby, the pitch of the laser light beam emitted by the light emission points of the laser diode arrays 202 can be adjusted and consequently an adjacent two of the four laser light beam spots arranged in a staggered formation are adjusted to have a desired pitch P2b in the sub-scanning direction, as shown in FIG. 14.

The laser light source unit 201 is provided with a prism 208 including pillars of a parallelogram cross-section and a triangular cross-section. This prism 208 reflects the laser light beams from one of the laser diode arrays 202 with an inclined surface 208a. The laser light beams are then reflected by a beam splitting surface 208b and run in close to the laser light beams from the other laser diode array 202. The laser light beams running close together are reflected by the polygon mirror simultaneously and continuously. Thereby, the laser light beams form respective beam spots on the photosensitive member. An aperture element 209 is fixed to an optical housing (not shown) in a similar manner as described in the case of the laser light source unit 101. In the example being explained, the laser light beams from the laser diode arrays 202 are run close together to substantially overlay each other and therefore a common slit is used in aperture element 209. The common flange member 206 is held by a holder 210 and is mounted to the optical housing such that a cylinder portion 210a of the holder 210 is engaged with a reference hole 211a of a mounting wall 211 in a similar manner as described in the case of the laser light source unit 101. With this arrangement, the entire laser light source unit 201 can be rotated so that a formation of the beam spots is appropriately tilted.

In FIG. 13, reference numerals 212 denote screws for fitting the common flange member 206 to the holder 210, and reference numeral 213 denotes an adjustment screw. As in the case of the laser light source unit 101, the adjustment screw 213 adjusts a stop position at which the laser light source unit 201 is stopped. With this adjustment, the laser light source unit 201 can instantly be tilted about the light axis in the direction B. By rotating the laser light source unit 201 in the direction B, the four light emission points of the two laser diode arrays 202 are rotated about a center point E3 thereof. Consequently, the pitch P1b of the four light emission points can be adjusted. The laser light beams are shaped in a desired fashion by the common slit in the aperture 209 fixed to the optical housing (not shown) of the laser light source unit 201. As a result, the four laser light beam spots are formed by the four laser light beams on the photosensitive member, and adjacent two of the four laser light beam spots arranged in a staggered formation are adjusted to have a desired pitch P2a in the sub-scanning direction, as shown in FIG. 14.

Figure 15A:
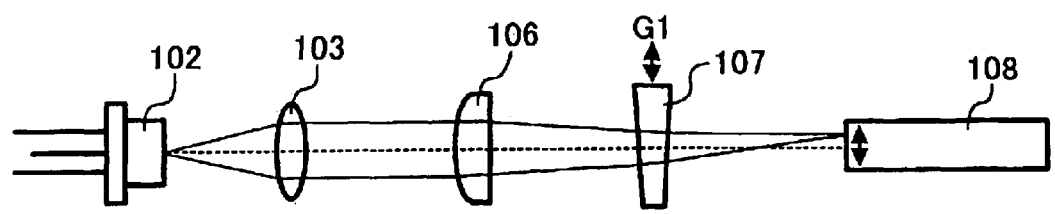
FIGS. 15A–15C are schematic illustrations for explaining exemplary ways for adjusting a pitch of the scanning lines.
Figure 15B:
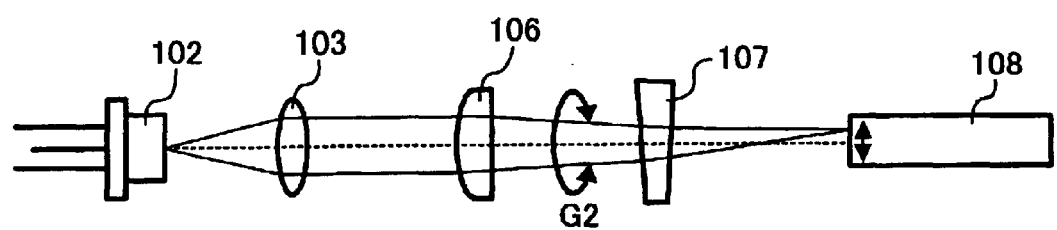
Figure 15C:
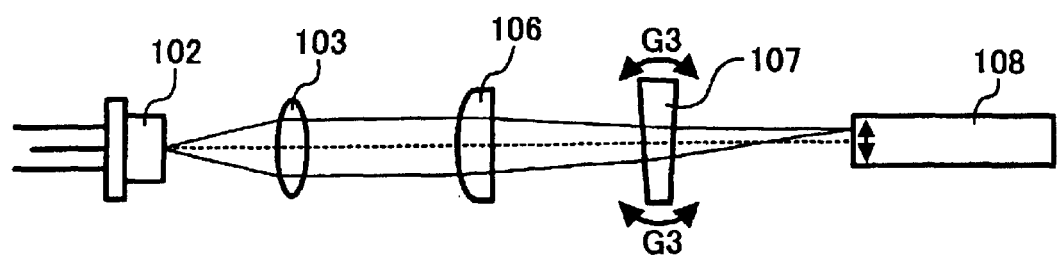

FIGS. 15A–15C shows exemplary easy adjustments of the pitch P2 of the laser light beam spots in the sub-scanning direction on the photosensitive surface. In FIG. 15A, a portion of the multi-beam optical scanning apparatus 100 is shown, including the light source 102, the coupling lens 103, the cylindrical lens 106, and the polygon mirror 108. In addition to these optical components, a prism 107 is provided on the laser beam axis between the cylindrical lens 106 and the polygon mirror 108. The prism 107 is held for movement in a direction G1 which corresponds to the sub-scanning direction. By moving the prism 107, the laser light beams entering to the polygon mirror 108 are changed in their positions in the sub-scanning direction as well as the incident angles. Thereby, the pitch P2 of the laser light beam spots can efficiently be adjusted in the sub-scanning direction on the photosensitive surface.

In FIG. 15B, the prism 107 is held for rotation in a direction G2 around the laser beam axis. By rotating the prism 107 in the direction G2, the laser beams entering to the polygon mirror 108 are changed in their positions in the sub-scanning direction as well as the incident angles, as in the case of FIG. 15A. Therefore, the pitch P2 of the laser light beam spots can efficiently be reduced in the sub-scanning direction. Likewise, FIG. 15C shows an exemplary case in which the prism 107 is held for rotation in a direction G3 around a horizontal axis orthogonal to the laser beam axis. By rotating the prism 107 in the direction G3, the pitch P2 of the laser light beam spots can efficiently be adjusted in the sub-scanning direction.

The easy pitch adjustments shown in FIGS. 15A–15C can be used independently or in combination.

Figure 16:
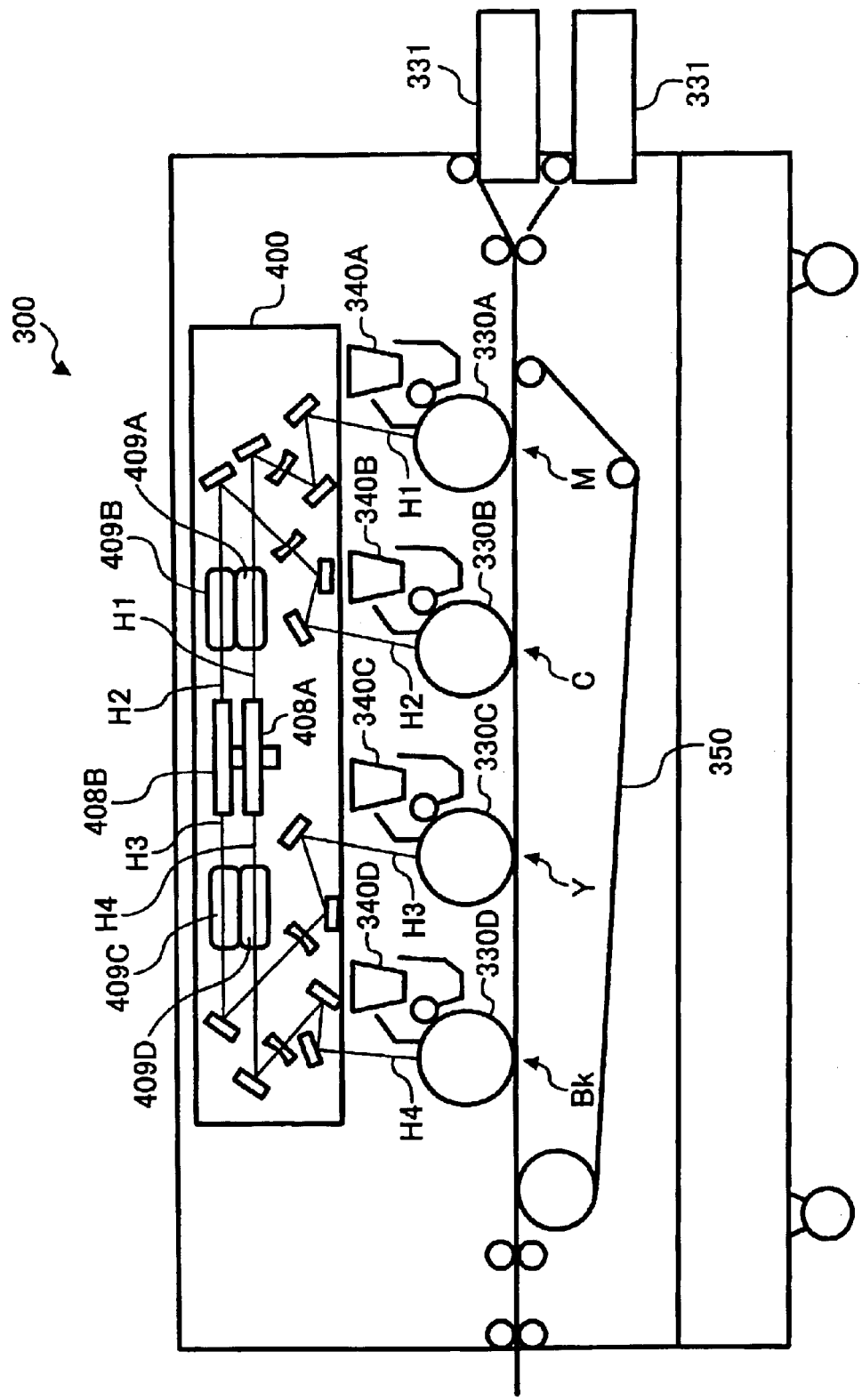
FIG. 16 is a schematic illustration for explaining an exemplary structure of a full color image forming apparatus using the multi-beam optical scanning system of FIG. 5 with the light source unit of FIG. 13.

Referring to FIG. 16, a description is made for an exemplary application of the multi-beam optical scanning apparatus 100 to an image forming apparatus such as a digital copying machine, a printer, etc. As one example of an image forming apparatus, FIG. 16 shows a tandem-type full-color image forming apparatus 300 including a multi-beam color optical scanning apparatus 400. The multi-beam color optical scanning apparatus 400 is based on the multi-beam optical scanning apparatus 100 having the easy pitch adjustment shown in FIGS. 15A–15C. As shown in FIG. 16, the tandem-type full-color image forming apparatus 300 further includes four photosensitive drums 330A–330D serving as image carrying members for carrying magenta, cyan, yellow, and black images, respectively. The tandem-type full-color image forming apparatus 300 further includes development units 340A–340D for developing images in magenta, cyan, yellow, and black toners, respectively, on the photosensitive drums 330A–330D, respectively. The four photosensitive drums 330A–330D are arranged in combination with the development units 340A–340D, respectively, in parallel to each other on a lateral plane substantially parallel to a sheet transfer path through which a recording sheet supplied from either one of sheet cassettes 331 is transferred by a sheet transferring mechanism 350.

The multi-beam color optical scanning apparatus 400 includes two polygon mirrors 408A and 408B and four optical, scanning component sets 409A–409D. A laser beam bundle H1 from the polygon mirror 408A goes to the photosensitive drum 330A via the optical scanning component set 409A and forms a latent image to be developed with a magenta color on the photosensitive drum 330A. Likewise, a laser beam bundle H2 from the polygon mirror 408B goes to the photosensitive drum 330B via the optical scanning component set 409B and forms a latent image to be developed with a cyan color on the photosensitive drum 330B. A laser beam bundle H3 from the polygon mirror 408B goes to the photosensitive drum 330C via the optical scanning component set 409C and forms a latent image to be developed as a yellow color on the photosensitive drum 330C. A laser beam bundle H4 from the polygon mirror 440A goes to the photosensitive drum goes 330D via the optical scanning component set 409D and forms a latent image to be developed as a black color on the photosensitive drum 330D.

Each latent image is developed by the corresponding development unit into a corresponding color image and the developed color image is transferred onto the recording sheet transferred by the sheet transferring mechanism 350. This process is repeated four times such that four color images are perfectly overlapped onto each other on the recording sheet. Thereby, a full color image is formed. After that, the full color image is fixed with heat, for example, onto the recording sheet.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2001-381862 filed on Dec. 14, 2001 in the Japanese Patent Office, the entire contents of which are incorporated by reference herein.

What is claimed is:

1. An optical scanning apparatus, comprising:
a plurality of light sources;
an aperture having at least one slit; and
a plurality of coupling lenses,
wherein numbers of the plurality of light sources and the plurality of coupling lenses are equal to each other and said apparatus satisfies an inequality $$12.7 < (D \times \beta_0 \times m_0 \times \text{dpi})/(2 \times NA) < 38.1$$

and an equation $$\beta_0 = (\beta_+ - \beta_{31})/(n-1),$$

wherein D represents a width of said at least one slit of the aperture, $\beta_0$ represents a beam open angle, $m_0$ represents a total lateral magnification ratio, dpi represents a number of dots per inch, NA represents a numerical aperture, $\beta_+$ represents a positive open angle, $\beta_-$ represents a negative open angle, and n represents said numbers.

2. An optical scanning apparatus as defined in claim 1, wherein the total lateral magnification ratio $m_0$ satisfies an inequality $1 < m_0 < 15$.

3. An optical scanning apparatus as defined in claim 1, wherein each of the plurality of light sources includes a laser diode.

4. An optical scanning apparatus as defined in claim 1, wherein each of the plurality of light sources includes a laser diode array including more than one light emission point.

5. An optical scanning apparatus as defined in claim 4, wherein the total lateral magnification ratio $m_0$ satisfies an inequality $0.5 < m_0 < 15$.

6. An optical scanning apparatus as defined in claim 1, wherein said apparatus further satisfies an inequality $0.3 < (D \times \beta_0 \times m_0)/(2 \times NA \times W) < 1.5$, wherein W represents a diameter of a laser light beam spot at a $1/e^2$ intensity point.

7. An image forming apparatus, comprising:
a plurality of photosensitive members each having a photosensitive surface;
a plurality of development mechanisms each configured to develop an image with a different color toner; and
an optical scanning apparatus which comprises:
a plurality of light sources;
a plurality of coupling lenses; and
an aperture having at least one slit,
wherein numbers of the plurality of light sources and the plurality of coupling lenses are equal to each other and said apparatus satisfies an inequality $$12.7 < (D \times \beta_0 \times m_0 \times \text{dpi})/(2 \times NA) < 38.1$$

and an equation $$\beta_0 = (\beta_+ - \beta_-)/(n-1),$$

wherein D represents a width of said at least one slit of the aperture, $\beta_0$ represents a beam open angle, $m_0$ represents a total lateral magnification ratio, dpi represents a number of dots per inch, NA represents a numerical aperture, $\beta_+$ represents a positive open angle, $\beta_-$ represents a negative open angle, and n represents said numbers,
wherein the optical scanning apparatus forms latent images for development in different colors on the photosensitive surfaces of the plurality of photosensitive members and the latent images for the different colors are developed into visual images with the different color toners by the plurality of development mechanisms.

* * * * *